Feb. 3, 1959 W. BENNETT ET AL 2,872,208
TOWING AND BRAKING ASSEMBLY FOR TRAILERS
Original Filed March 9, 1954 4 Sheets-Sheet 1

WALTER BENNETT,
PERCIVAL M. HEINMILLER,
INVENTORS.

BY
Bachelor & Lewis

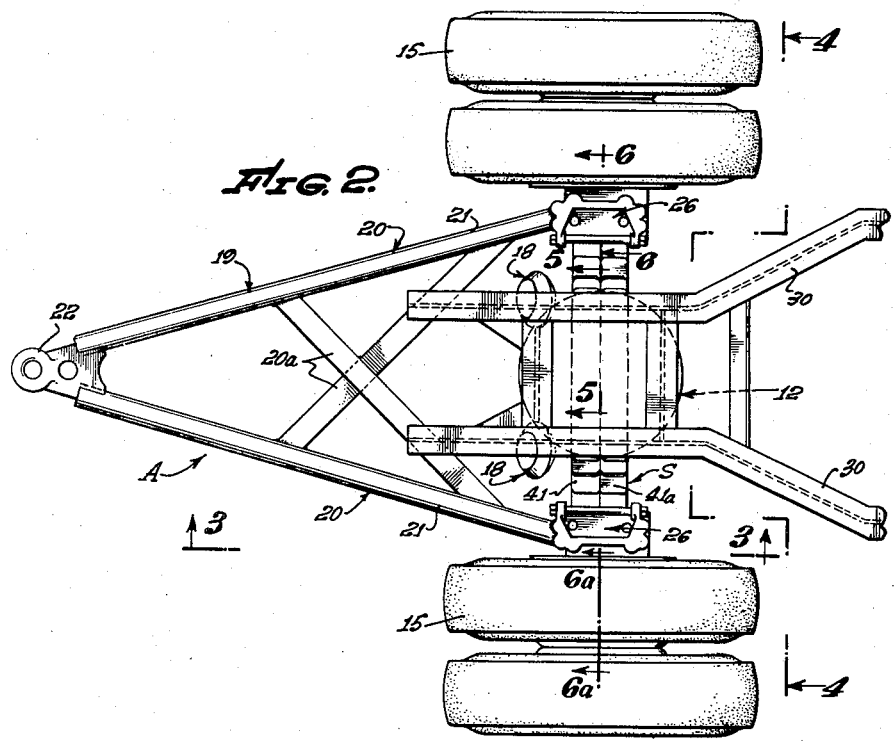
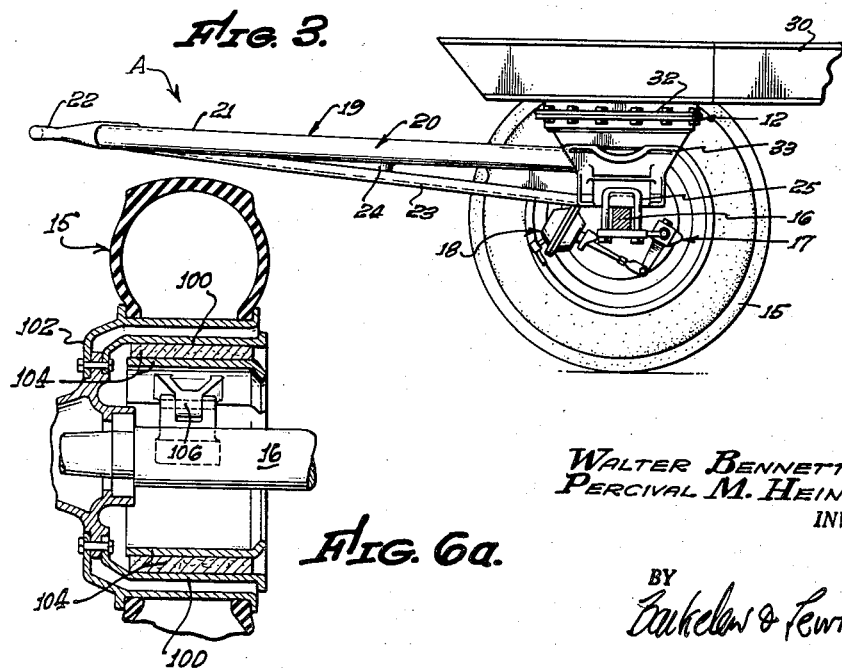

Walter Bennett,
Percival M. Heinmiller,
INVENTORS.

Feb. 3, 1959 W. BENNETT ET AL 2,872,208
TOWING AND BRAKING ASSEMBLY FOR TRAILERS
Original Filed March 9, 1954
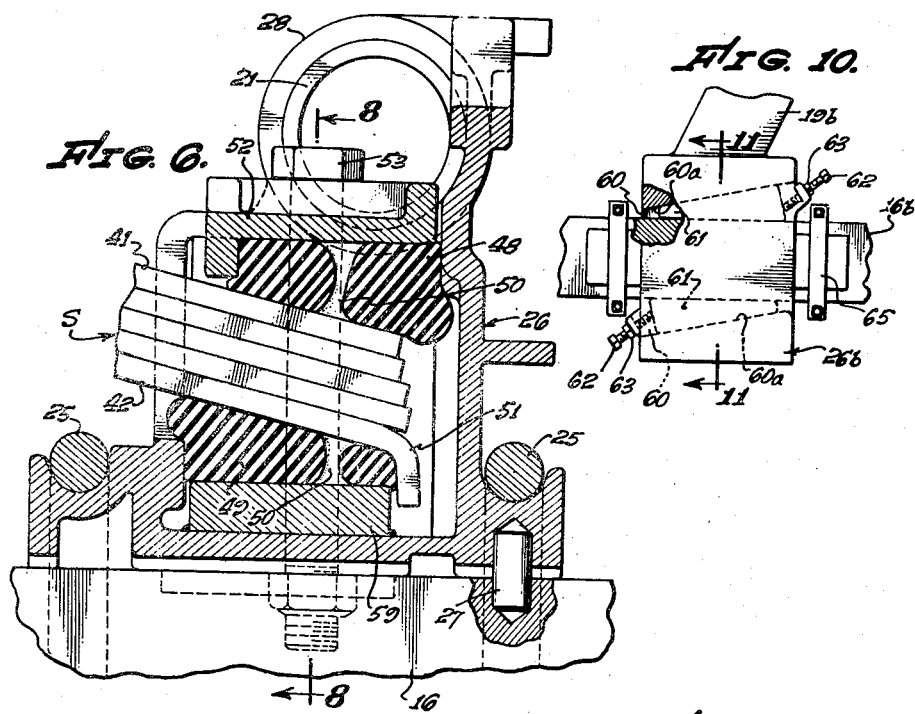
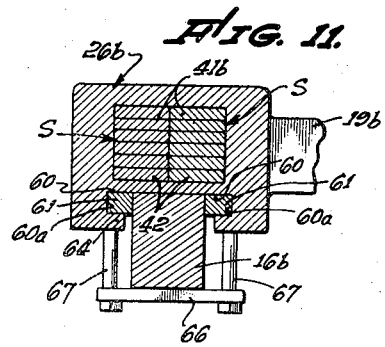
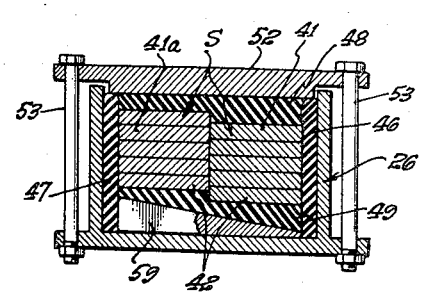
WALTER BENNETT,
PERCIVAL M. HEINMILLER,
INVENTORS.

United States Patent Office 2,872,208
Patented Feb. 3, 1959

2,872,208

TOWING AND BRAKING ASSEMBLY FOR TRAILERS

Walter Bennett, Los Angeles, and Percival M. Heinmiller, La Canada, Calif., assignors to Utility Trailer Manufacturing Company, San Francisco, Calif., a corporation of California Continuation of application Serial No. 414,928, March 9, 1954. This application September 13, 1956, Serial No. 609,691

9 Claims. (Cl. 280—116)

This invention has to do generally with tractor and trailer combinations and towing assemblies for trailers, and is more particularly concerned with such devices and assemblies wherein it is desired to transmit torque from the trailer axle to the tractor.

This application is a continuation of our application Ser. No. 414,928, filed March 9, 1954 (now abandoned) on the same subject matter.

Regarding the towing assembly, as will be described, it may be used in connection with a "full trailer" or a "semi-trailer" or as a "converter dolly."

A general object of the invention may be stated as the provision of means whereby torque applied to the axle is transmitted by the draw bar directly to the tractor.

The significance of this feature can best be understood by initial reference to usual systems. In those usual systems the draw bar is hingedly connected to the trailer frame or axle. As a result, torque applied to the trailer axle as the result of braking the trailer, or by reason of irregular road surfaces (particularly "bumpy" surfaces) or by reason of acceleration, or for any other reason, are transmitted from the trailer axle through the springs to the coupling between the springs and the trailer. Such a coupling is typically a kingpin or a fifth wheel. The draw bar plays no part in transmitting this torque to the tractor, and all the forces must be absorbed by the connective system between the trailer axle and frame. This imposes high stresses on and rapid wear of connective parts, causes fifth wheel "bucking," or "kicking," brake "snatch," trailer whipping, jack knifing, and generally noisy operation.

In contradistinction to this, the present invention contemplates the substantially rigid connection of the draw bar and trailer axle to hold them against relative angular movements in vertical and horizontal planes. Accordingly, any torque applied by any force to the trailer axle is transmitted to the draw bar, and, by it, transmitted to the rear end of the tractor frame through the usual draft connection. The most significant of the torque producing forces, is that set up by braking the trailer wheels, for applied brakes act to rotatively connect the trailer wheels to the trailer axle, and it is this force that causes most of the difficulty in usual tractor and trailer connections. However, while the present invention came about during a successful effort directed mainly to counter-act and brake-produced force, it inherently also counteracts other and important torque-producing forces.

With the axle and draw bar rigidly connected, provision is made for articulation between the axle and the trailer frame to accommodate the relative angular movement of the draw bar in a vertical plane due to different heights of the draft coupling or caused by road undulations. This articulation allows relative angular movement, as between the trailer frame and the axle-drawbar unit, in a vertical plane transverse of the axle. As a preferred articulation a rubber mount is provided between the spring and the axle close to the axle axis, although articulation may be provided by a similar mount between the spring and the fifth wheel.

As a special feature, the rubber mounts are preferably prestressed so, when the trailer is uncoupled from the tractor, the free end of the draw bar remains at or about "coupling" height, it thus being unnecessary for the operator to manually lower or raise the heavy bar during uncoupling or coupling operations.

The inherent resiliency of the relatively long draw bar helps to absorb the shocks due to the sudden imposition of torque, to obvious advantage.

It has been found that the above described arrangement totally eliminates fifth wheel "kick" or "buck" and spring "wind up." It takes the torque off the connective system between the trailer axle and frame, it greatly reduces the wear of parts. It eliminates "weaving," "whipping" and "jack-knifing." It rigidly guides the trailer axle and thus gives improved steering. When the trailer brakes are applied, the draw bar applies a downwardly exerted force to the rear end of the tractor and thus beneficially increases the tractive load on the rear wheels of the tractor to increase and maintain brake efficiency. In this connection, the load is imposed on and partially absorbed by the tractor springs, and sudden shocks are thus greatly cushioned.

Other objects and features of novelty will be apparent from the following detailed description, reference being made to the accompanying drawings, in which:

Fig. 2 is a top plan view of the towing assembly attached to a trailer;

Fig. 3 is a section on line 3—3 of Fig. 2;

Fig. 6 is an enlarged detail, transverse section on line 6—6 of Fig. 2;

Fig. 6a is a schematic fragmentary section on line 6a—6a of Fig. 2, showing a conventional type of brake acting to transmit wheel torque to the axle;

Fig. 8 is a section on line 8—8 of Fig. 6 as to aspect, but showing the parts in simplified form;

Fig. 10 is a schematic showing of a variation in box mounting whereby axle alinement may be accomplished; and Fig. 11 is a section on line 11—11 of Fig. 10.

Figure 1:
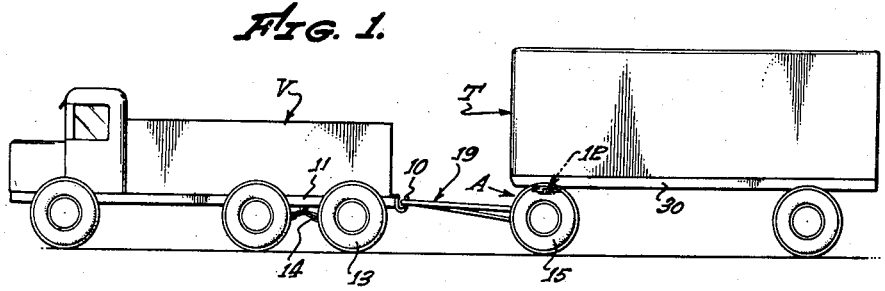
Fig. 1 is a schematic side elevation showing an embodiment of the invention.

In Fig. 1 we have illustrated a tractor or towing vehicle V, with a usual draft hook 10 applied to its frame 11, a trailer T, and a towing assembly A connecting the two vehicles. There is conventionally indicated at 12 a fifth wheel type of load bearing connection between assembly A and trailer T, though it will be appreciated that this is not limitative on the invention, for any suitable type of connection, that restricts or inhibits relative angular movement in vertical planes between the trailer frame and assembly A, may be used. The connection may be of a type more or less permanently connecting the assembly and trailer, or it may be of the easily disconnectible type.

Figure 4:
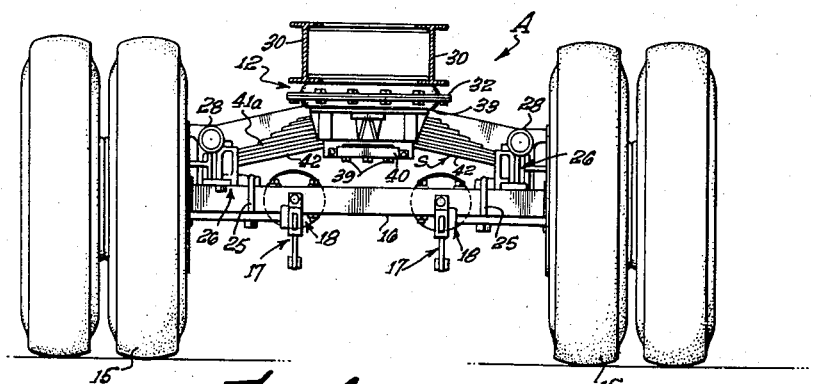
Fig. 4 is a section on line 4—4 of Fig. 2.

For purposes of future reference, the rear wheels of tractor V are indicated at 13, and the rear springs are indicated at 14. The front wheels 15 of trailer T are rotatively supported at the opposite ends of dead axle 16 in any usual manner, and are normally provided with usual brakes and brake operating mechanisms. Fig. 6a shows a conventional type of brake, composed of brake drum 100 mounted on wheel disk 102 and brake shoes 104 mounted on axle 16 at 106, the shoes adapted to be moved out into drum contact by actuation of the operating mechanism 17, 18 shown in Figs. 3 and 4. This showing is intended to be merely of conventional brakes which transmit braking torque from the wheels to the axle.

The draw bar 19 is preferably V-shaped, as viewed in plan, the legs 20, each preferably comprising a tubular member 21, and a truss made up of angle iron member 23, which slopes slightly downwardly and rearwardly, and the web 24, all welded together. Preferably, crossed, diagonal braces 20a connect the two legs 21. The forward ends of tubes 21 are connected by draft eye 22. Draw bar 19 is rigidly connected to axle 16 to prevent relative angular movement between the two in horizontal and vertical planes. The connection comprises the following elements. Near the opposite ends of axle 16 and firmly and rigidly clamped thereto by U-bolts 25, are sturdy box-like members 26. To positively prevent relative shift between axle and boxes, any suitable positioning means may be used, for instance interlocking dowels such as shown at 27 in Fig. 6.

Figure 7:
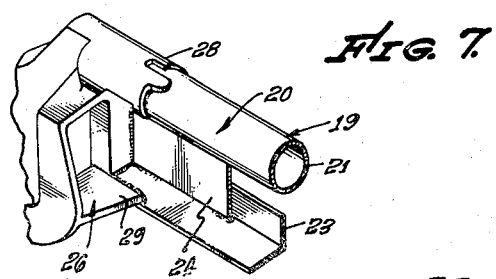
Fig. 7 is a fragmentary perspective showing how the draw bar is fixed to the axle-carried box.

Each box has a tubular socket 28 and a downwardly spaced, forwardly facing horizontal flange 29 (see Fig. 7) tubes 21 being welded in sockets 28 and angles 23 being welded to flange 29. More will be said of box members 26 at a later point in the description.

Figure 5:
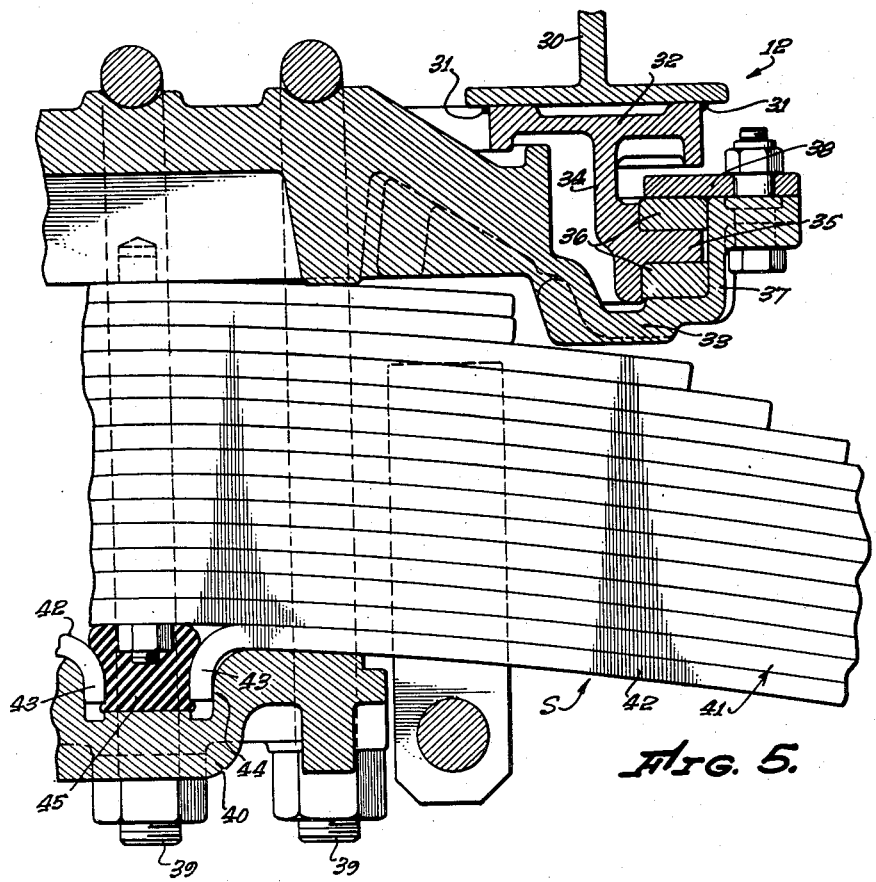
Fig. 5 is an enlarged detail section on line 5—5 of Fig. 2.

The longitudinal frame members 30 of trailer T are illustrated as being of I cross section, though this is not, of course, limitative. Welded at 31 (Fig. 5) to the underside of frame members 30 is the upper member 32 of fifth-wheel 12. This, as well as the lower member 33 of the fifth wheel, may be of any suitable design. Here, upper member 32 includes a depending annular flange 34 supporting an integral, horizontal annular flange 35 which is taken between bearing rings 36. These rings, in turn, are taken in the cup 37 of lower member 33, a hold-down ring 38 retaining members 32, 33 and 36 in operative assembly.

Clamped, by U-bolts 39 and plate 40, to the under side of member 33 is the spring assembly S. Now while it lies within the broad scope of our invention to provide any type of spring support for the trailer frame, we have chosen to illustrate, as preferable, a transverse spring support. While this may be a single assembly of stacked leaves, it is preferable that two or more side-by-side and longitudinally coextensive assemblies be used. Here, for instance, side-by-side springs are indicated at 41, 41a. The lower leaf 42 of each spring is bent over at 43 and clamped between plate-flange 44 and rubber plug 45, the spring assembly thus being held against shifting lengthwise since all leaves are held together, and hence to leaf 42, in the usual manner.

The outer ends of the springs are taken in mounts provided by boxes 26 which, as has been noted, rigidly connect axle 16 and draw bar 19. Each box is lined with rubber pads, as illustrated in Figs. 6 and 8, the fore and aft pads being indicated at 46 and 47, respectively in Fig. 8 (it being remembered that this view is reversed in aspect with respect to Fig. 3) and the top and bottom pads being indicated at 48 and 49, respectively, the latter two pads preferably being pierced at 50. The pads, taken together, form a rubber sleeve about the spring ends, the lowermost leaves 42 being hooked over pad 49 at 51. The pads may, of course, be integrated into a single sleeve.

The rubber is pre-stressed and tightly compacted about the springs by clamp plate 52, which forms the top of box 26, as pressed downwardly by bolts 53.

Figure 9:
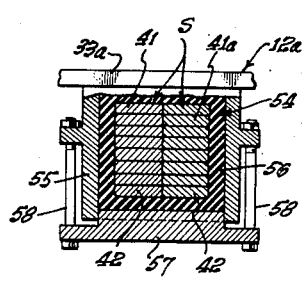
Fig. 9 is a schematic section showing a modified mounting between the spring and the fifth wheel.

Now, it has been explained that, due to the rigidity of the connection between the draw bar 19 and axle 16, there must be a capacity for articulation, for relative angular movement in a vertical plane, in the connection between the axle 16 and frame 30. The articulation may be at any suitable point in this connection, but here it is illustrated as preferably being mainly in the mount of the spring ends, where the rubber adds its resistively allowed angular movement to that due to twisting of the springs. It will be appreciated, of course, that, in place of rubber, other articulatory connections, such as pivotal joints, may be used. In Fig. 9 we have shown a variation wherein the articulation is provided for by way of a rubber mount 54 at the central point of the spring supporting system. That is, the lower member 33a of fifth wheel 12a is in the form of a box 55 enclosing a rubber sleeve 56 which is pre-stressed and compacted about the springs by forcing plate 57 upwardly through actuation of bolts 58.

Now returning to Figs. 6 and 8, we have shown means for pre-stressing the rubber sleeves in boxes 26 in a very particular way, thereby gaining decided advantage. Here, a wedge 59 is introduced in the bottom of box 26 before the rubber is applied, the thin edge of the wedge pointing forwardly. This displaces the rubber in the manner clearly shown in Fig. 8, thus pre-stressing the rubber in such fashion that the forward end of draw bar 19, when freed from the tractor, stays at about coupling height, thus avoiding the necessity of manually lowering or raising this member during uncoupling and coupling operation. Of course, by shifting the wedge fore or aft, the free end of the draw bar is resiliently held at different heights. However, with it known how high a given bar should be for making any given connection and knowing from experience or by trial where the wedge should be to accomplish the desired result, the wedge may be permanently welded or otherwise secured in its proper place. And, of course, the bottom of the box may be fashioned as an inclined plane, which gives the same results and avoids the necessity of fashioning and applying a separate wedge member.

It will be seen that when draw bar 19 is hooked to tractor V, all downbearing load imposed on the bar is imposed on hook 10 and by it is transmitted to frame 10. And it will also be seen that because of the connections described, all forces which apply torque to axle 16 are transmitted to the draw bar and thence to vehicle V, thus relieving all the connections between axle 16 and trailer frame 30 from the harmful effects of such torque. The many great advantages flowing from the novel arrangement were discussed quite fully in the fore part of the specification and therefore need not be repeated here. It is believed they will be entirely clear in view of the detailed description which has been given.

It will be readily understood that, with articulation about a horizontal axis parallel with the axle (articulation for relative angular movement in a vertical plane transverse of the axle) limitation, and preferably elastically resistive limitation of the relative movement is desirable, and practically necessary, for two reasons. The first is to prevent the collapse of the load supporting system when the draw bar is uncoupled; the second, to support, either partially or wholly, the weight of the uncoupled draw bar. With the horizontal axis of articulation close to the axis of the axle (as it is in the preferred form and location of the articulation shown particularly in Fig. 6) the resistive force necessary to prevent collapse under a given load is less than that required with the axis of articulation located away from the axle—as for instance at the top of the spring as shown in Fig. 9. For such reasons the form of Fig. 6 is preferred, where the articulation is on a horizontal axis running approximately through the spring ends close to the axle.

In Figs. 10 and 11 we have schematically shown means whereby the axle may be alined to compensate for inaccuracies in manufacture or inaccuracies developing by reason of use. Here, the box 26b, with its springs 41b and its rigidly connected draw bar 19b, has ways 60 which are inclined with respect to the longitudinal axis of axle 16b, the ways extending along the upper edges of the front and rear faces of the axle. The inclined faces 60a are parallel. Entered in ways 60 are complementary wedge members 61, adapted to be forced into wedging engagement with the box and axle by box-carried bolts 62, provided with lock nuts 63. Horizontal flanges 64 hold the wedges from dropping out of the ways. Straps 65, 66 and bolts 67 provide releasable means for rigidly clamping box 26b to the axle.

When axle alinement becomes necessary, bolts 62 and 67 are loosened and the box and axle are moved relatively transversely by adjusting wedges longitudinally until alinement is secured or restored. Both wedges are then wedged into tight engagement with the box and axle, by manipulation of bolts 62, and the lock nuts 63 and bolts 67 are re-tightened.

While we have shown and described preferred embodiments of our invention, various changes in design, structure and arrangement may be made without departing from the spirit and scope of the appended claims.

We claim:

1. A towing assembly for trailers, embodying an axle having ground engaging wheels disposed at the outer ends thereof, a draw bar, means substantially rigidly connecting the draw bar and axle against relative angular movements in vertical and horizontal planes, a spring extending above and parallel to the axle, a pair of box members rigidly connected, one each, to opposite ends of the axle, a pair of rubber sleeves held, one each, in said boxes, the opposite ends of said spring being entered and clamped, one each, in the bores of the sleeves, and a load bearing coupling member connected to said spring between the boxes, each of said boxes containing a tapered surface in its bottom inclining upwardly and rearwardly and engaging the under side of the sleeve to pre-stress the sleeve and spring in a manner holding the free end of the draw bar elevated to a predetermined height above the ground level.

2. A towing assembly for trailers, embodying an axle having ground engaging wheels disposed at the outer ends thereof, a spring extending above and parallel to the axle, connecting means between the opposite ends of the spring and the opposite ends of the axle, a load bearing coupling member supported on said spring, a draw bar, the draw bar and axle being substantially rigidly held against relative angular movements in vertical and horizontal planes, one of said connecting means being adjustable to allow shifting of the relative fore and aft positions, with relation to the longitudinal axis of the trailer, of the spring and one end of the axle, and lock means holding said one of said connecting means and said one end in adjusted position.

3. A towing assembly for trailers, embodying an axle having ground engaging wheels disposed at the outer ends thereof, a pair of side-by-side and longitudinally coextensive springs extending above and parallel to the axle, articulated end-mounting means connecting the opposite ends of the springs to opposite ends of the axle, a load bearing coupling member, means connecting said member to the springs, a draw bar, means substantially rigidly connecting the draw bar and axle against relative angular movements in vertical and horizontal planes, said end mounting means at each end of the axle including a rubber sleeve clamped about the two springs, and means pre-stressing the sleeves and springs in a manner holding the free end of the draw bar elevated to a predetermined height above the ground level.

4. In combination with a trailer, a towing assembly comprising a load supporting and running gear system including a dead axle, ground wheels rotatably mounted on the axle, brake mechanism acting between the wheels and axle to apply braking torque from the wheels to the axle, means for supporting the trailer on the axle including spring means, fifth wheel means and articulation means, said supporting means allowing relative angular movement between the axle and the trailer in a horizontal plane, and a mount for said spring means upon the axle, a substantially rigid draw bar connected to the axle in substantially rigid relation thereto as regards movements in both horizontal and vertical planes, the draw bar extending forwardly of the axle and adapted at its forward end to be connected to a towing vehicle, said articulation means elastically resisting angular movement of the axle and draw bar relative to the trailer about a horizontal axis parallel with said axle, said mount for said spring means including at least a part of said elastically resistive articulation means.

5. The combination defined in claim 4, in which the spring means is in the form of a semi-elliptic spring extending above and parallel to the axle, said spring forming a part of said articulation means and being elastically twistable about an axis longitudinal of itself, the two ends of said spring being mounted upon the axle and the center of said spring being mounted under and attached to the fifth wheel means.

6. The combination defined in claim 5 and in which the mountings of the spring ends upon the axle embody boxes with rubber-like linings forming a part of said articulation means and enclosing the spring ends and allowing elastically resisted relative angular movement between the axle and spring ends about an axis parallel to the axle.

7. The combination defined in claim 6 and including means for pre-stressing the rubber-like linings to selectively set the relative angular position of the axle and its attached draw bar relative to the spring.

8. The combination defined in claim 4 and in which the articulation and the last mentioned means include a mount for the spring means upon the axle, said mount embodying a box structure with rubber-like lining enclosing the spring means and allowing elastically resisted relative angular movement of the axle with relation to the spring means about an axis parallel to the axle.

9. The combination defined in claim 8 and including means for pre-stressing the rubber-like lining to selectively set the relative angular position of the axle and its attached draw bar relative to the spring means.

References Cited in the file of this patent

UNITED STATES PATENTS

| 120,106 | Saladee | Oct. 17, 1871 |
| 305,850 | Saladee | Sept. 30, 1884 |
| 1,236,038 | Austin | Aug. 7, 1917 |
| 1,578,145 | Leipert | Mar. 23, 1926 |
| 2,413,212 | Brown | Dec. 24, 1946 |
| 2,506,718 | Grant | May 9, 1950 |
| 2,643,111 | Burton | June 23, 1953 |